US008903867B2

(12) United States Patent
Antonelli et al.

(10) Patent No.: US 8,903,867 B2
(45) Date of Patent: Dec. 2, 2014

(54) METHOD FOR EXPLORING A CATALOG OF DIGITAL INFORMATION CONTENTS

(75) Inventors: Fabrizio Antonelli, Turin (IT); Dario Mana, Turin (IT); Monica Perrero, Turin (IT); Federica Protti, Turin (IT); Rossana Simeoni, Turin (IT)

(73) Assignee: Telecom Italia S.p.A., Milan (IT)

( * ) Notice: Subject to any disclaimer, the term of this patent is extended or adjusted under 35 U.S.C. 154(b) by 163 days.

(21) Appl. No.: 13/394,743

(22) PCT Filed: Sep. 8, 2009

(86) PCT No.: PCT/IT2009/000402
§ 371 (c)(1),
(2), (4) Date: Aug. 20, 2012

(87) PCT Pub. No.: WO2011/030357
PCT Pub. Date: Mar. 17, 2011

(65) Prior Publication Data
US 2013/0054652 A1 Feb. 28, 2013

(51) Int. Cl.
*G06F 17/30* (2006.01)
(52) U.S. Cl.
CPC .... *G06F 17/30961* (2013.01); *G06F 17/30994* (2013.01)
USPC .......................................... 707/797; 707/805
(58) Field of Classification Search
USPC .......................................... 707/797, 798, 805
See application file for complete search history.

(56) References Cited

U.S. PATENT DOCUMENTS 5,918,236 A * 6/1999 Wical ............................ 715/209
6,462,762 B1 * 10/2002 Ku et al. ....................... 715/853

(Continued)

OTHER PUBLICATIONS

Nesbitt; "Getting to More Abstract Places Using the Metro Map Metaphor", Proceedings of the Eighth International Conference on Informaiton Visualisation, London, IEEE Computer Society, pp. 488-493, (2004).

(Continued)

*Primary Examiner* — Khanh Pham
(74) *Attorney, Agent, or Firm* — Oblon, Spivak, McClelland, Maier & Neustadt, L.L.P.

(57) ABSTRACT

A method for exploring a catalog of digital information contents through a user apparatus is provided with a display screen, in which the catalog of digital information contents is structured according to at least two hierarchical tree structures, each including a respective hierarchy of nodes, each node corresponding to a respective category of digital information contents. The method includes: selecting a first sub-hierarchy of nodes of a first one of the at least two hierarchical tree structures, the first sub-hierarchy of nodes being built beginning from a selected category of the first hierarchical structure by selecting at least one among a first number of categories at immediately higher hierarchical levels in comparison to the selected category and a second number of categories at immediately lower hierarchical levels in comparison to the selected category; selecting a second sub-hierarchy of nodes of a second one of said at least two hierarchical tree structures, the second sub-hierarchy of nodes being built beginning from a destination category of the second hierarchical structure, the destination category being in relationship with the selected category, by selecting at least one among a first number of categories at immediately higher hierarchical levels in comparison to the destination category and a second number of categories at immediately lower hierarchical levels in comparison to the destination category; displaying on the screen icons representative of the categories of the first and of the second sub-hierarchy and respective relationships between the categories; and exploring the categories of the first and of the second sub-hierarchy reacting to commands imparted by the user through said user apparatus.

13 Claims, 13 Drawing Sheets

(56) References Cited

U.S. PATENT DOCUMENTS

| | | | |
|---|---|---|---|
| 6,888,554 B1* | 5/2005 | Decombe | 345/645 |
| 7,587,409 B2* | 9/2009 | Yakowenko et al. | 707/999.102 |
| 8,332,782 B1* | 12/2012 | Chang et al. | 715/853 |
| 2002/0113816 A1 | 8/2002 | Mitchell et al. | |

OTHER PUBLICATIONS

Robertson et al.; "Animated Visualization of Multiple Intersecting Hierachies", Journal of Information Visualization, vol. 1, No. 1, pp. 1-23, (2002), Graham et al.; "A Comparison of Set-Based and Graph-Based Visualisations of Overlapping Classification Hierarchies", Proceedings of the Working Conference on Advanced Visual Interfaces, pp. 41-50, (2000).

Graham et al.; "Exploring Multiple Trees Through Dag Representations", IEEE Transactions on Visualization and Computer Graphics, vol. 13, No. 6, pp. 1294-1301, (2007).

* cited by examiner

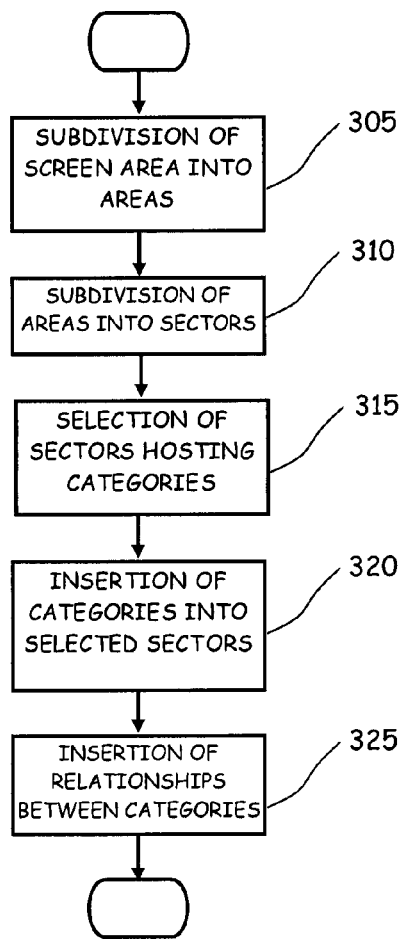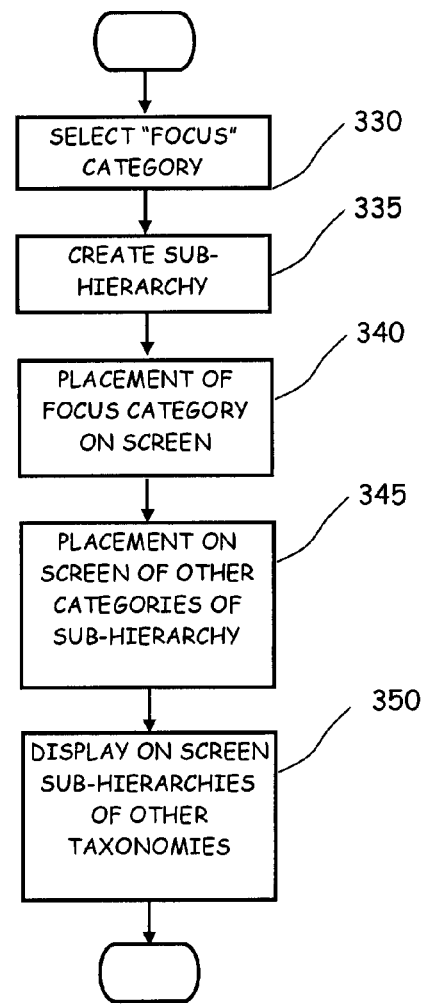
FIG. 3A
FIG. 3B

| Angle α | Level j-1 (category father) | Level j (category brother) | Level j+1 (category son) |
|---|---|---|---|
| 0° | UP | RIGHT | DOWN |
| 90° | UP | DOWN | LEFT |
| 180° | DOWN | LEFT | UP |
| 270° | DOWN | UP | RIGHT |
FIG. 13
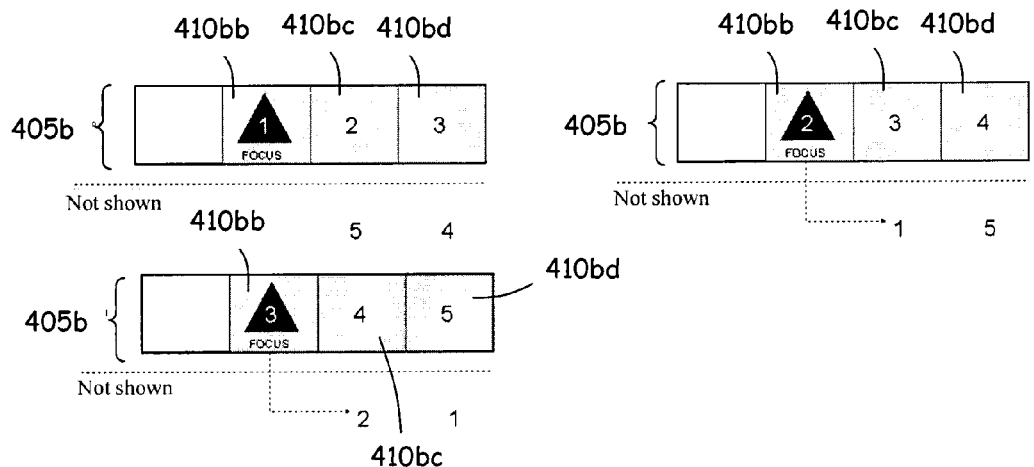
FIG. 14
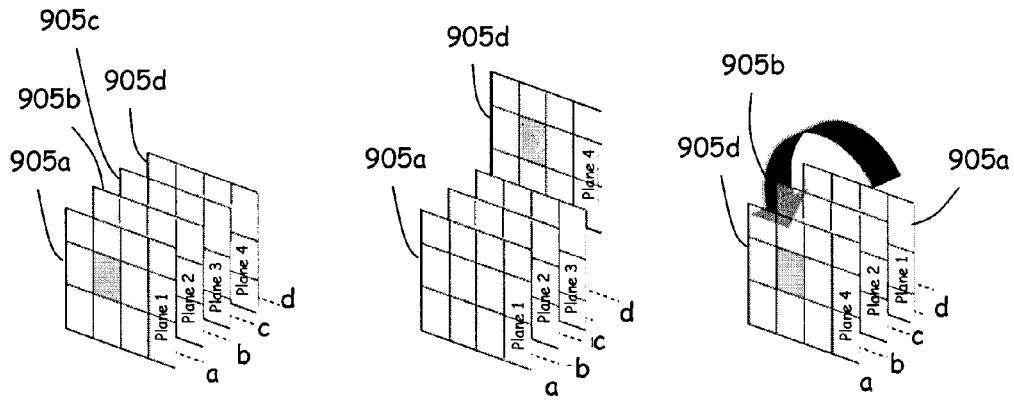
FIG. 15

METHOD FOR EXPLORING A CATALOG OF DIGITAL INFORMATION CONTENTS

CROSS REFERENCE TO RELATED APPLICATION

This application is a national phase application based on PCT/IT2009/000402, filed Sep. 8, 2009, the content of which is incorporated herein by reference.

TECHNOLOGICAL BACKGROUND OF THE INVENTION

1. Technical Field

The present invention relates in general to management techniques of digital information contents, like for instance texts, books, music, photos, videos, films, files of various kind (e.g., programs for computers) and the like. Particularly, the present invention concerns a method for viewing, hereinafter "exploring", by a user, a catalog of digital information contents, catalog that is structured according to hierarchies, or "taxonomies", of information contents.

2. Discussion of the State of the Technique

The huge amount of information contents in digital format available nowadays for the fruition by users has induced to devise ways for their organization in the form of catalogs hierarchically structured, and for the exploration thereof.

A classical way for representing a hierarchy of digital information contents is the tree structure; the algorithm for the creation of the tree structure is applied starting from the leaf nodes until the root node is reached, and is repeated recursively. At every level of the structure, the brother nodes are positioned at a distance such as not to produce intersections therebetween, and the father node is positioned above the children nodes, in central position.

In the literature, various techniques have been proposed for the representation, on a display device of a user apparatus, of complex hierarchies of contents, and for allowing the exploration by the user, through his/her own apparatus, of said hierarchies.

In Robertson G.; Cameron K.; Czerwinski M.; Robbins D., "Animated visualization of multiple intersectings hierarchies", Proc. IEEE InfoVis 2002, pp. 50-65, Boston, Massachussets, USA, Oct. 30-31, 2002. Computer Society Press., a method is presented to represent multiple hierarchies that intersect each other. The adopted display technique is called "visual pivot" and allows simultaneously showing two or more hierarchies with the "focus" on the node at which they intersect, called "pivot point". The authors propose two types of visualization: in the first one one hierarchy is shown at a time, and, when displaying another hierarchy having a node in common with the previous hierarchy, an animation is provided for, that shows the link between the two hierarchies, in such way that the user does not loose the view of the context; the second type shows more hierarchies simultaneously, placed side by side with conjunction lines between the shared nodes. In order to define these hierarchies, a preliminary classification of all the entities of the dominion and a definition of their attributes is required. A language similar to SQL (Structured Query Language), called PQL, allows performing quieres on a vast database classified according to several hierarchies.

A conceptual model also proposed in literature as a metaphor of navigation in a complex hierarchy of digital information contents is the so-called "subway map".

For example, in Nesbitt, K., "Getting to more Abstract Places using the Metro Map Metaphor", Eighth International Conference on Information Visualisation, London, IEEE Computer Society, 2004, pp. 488-493, there is shown how a series of abstract concepts, belonging to a series of conceptual threads, can effectively be represented as a subway map. Every concept corresponds to a station of the imaginary subway and every concept thread is represented by a line of the imaginary subway. Concepts that belong to several threads become stations in which different lines of the imaginary subway intersect.

U.S. Pat. No. 6,462,762 describes a method to facilitate the navigation among nodes of a tree structure. The role of "root" is assigned to different nodes of the tree based on the selection by the user of a node in the selected taxonomy, delimiting a section of the whole structure.

US 2002/113816 proposes a method to provide a graphic user interface to represent and to navigate in hierarchical nets, particularly for the exploration of a catalog of data hierarchically organized. The proposed method provides for the management of a set of objects connected to each other by hierarchical relationships and to move through the relationships on the horizontal plane and in depth on the vertical plane.

SUMMARY OF THE INVENTION

In view of the state of the art briefly discussed in the foregoing, the Applicant has tackled the problem of making easier the exploration of a very complex catalog of digital information contents for a user even if he/she is equipped with an apparatus having limited capabilities of displaying and interaction with the user, like for instance a television set or a mobile communication terminal such as for instance a cellular telephone.

Particularly, the present invention proposes a method for the representation and the interaction aimed at the exploration by a user of a catalog of digital information contents (the so-called "objects of the catalog") organized in multi-taxonomic form, i.e. in several hierarchies of concepts (where by "concept" a category of information contents is intended, i.e. a category of objects), in which each object of the catalog belongs to one or more categories, and each category is a concept making part of a hierarchical structure called "taxonomy".

According to an aspect of the present invention, a method is provided for the exploration of a catalog of digital information contents through a user apparatus provided of a displaying screen, in which said catalog of digital information contents is structured according to at least two hierarchical tree structures each one comprising a respective hierarchy of nodes, each node corresponding to a respective category of digital information contents, the method comprising:

selecting a first sub-hierarchy of nodes of a first one of said at least two hierarchical tree structures, said first sub-hierarchy of nodes being built beginning from a selected category of said first hierarchical structure by selecting at least one among a first number of categories at immediately higher hierarchical levels with respect to the selected category and a second number of categories at immediately lower hierarchical levels with respect to the selected category;

selecting a second sub-hierarchy of nodes of a second of said at least two hierarchical tree structures, said second sub-hierarchy of nodes being built beginning from a destination category of said second hierarchical structure, said destination category being in relationship with said selected category, by selecting at least one among a first number of categories at immediately higher hierarchical levels with respect to the destination category and a second number of categories at immediately lower hierarchical levels with respect to the destination category;

displaying on the screen icons representing the categories of the first and of the second sub-hierarchy and respective relationships between the categories; and exploring the categories of the first and of the second sub-hierarchy by reacting to commands imparted by the user through said user apparatus.

Said relationship between said destination category of the second sub-hierarchy of nodes and said selected category of the first sub-hierarchy of nodes is preferably a relationship of semantic type, with direct or indirect reference to the set of the digital information contents contained in said destination category and to said source category. Typically said relationship has associated intensity value and verse. Typically, said relationship is of dynamic type in time.

Said displaying the categories on the screen may for instance comprise:

dividing the area of the screen into a number of zones corresponding to a number of hierarchical levels of the first and of the second sub-hierarchy;

dividing each of said zones into a plurality of sectors;

selecting, for each of said zones, the respective sectors, and displaying said icons in the selected sectors.

Said second sub-hierarchy are preferably displayed on the screen rotated of a respective prescribed angle in comparison to said first sub-hierarchy.

The position of the screen in which the icons of the selected category of the first sub-hierarchy and the destination category of the second sub-hierarchy are displayed can be substantially the same position. The icons of the selected category of the first sub-hierarchy and of the destination category of the second sub-hierarchy can be shown on the screen with different levels of transparency. The icons of the selected category of the first sub-hierarchy and of the destination category of the second sub-hierarchy can be shown on the screen nested one into the other.

Said commands can be imparted by the user through keys of a keyboard interface of the user apparatus, or, in case said screen is a touch screen, touching the screen in regions where the categories are displayed.

The method can further include:

following the selection, upon command by the user, of a different category compared to said selected category, redetermining said first and said second sub-hierarchies and displaying the sub-hierarchies thus redetermined on the screen.

The method can further include displaying on a predetermined area of the screen a list of categories explored by the user and enabling the selection of any one of the categories previously explored.

According to another aspect of the present invention a user apparatus is provided, comprising a display device connnecatble through a data network to a remote server system adapted to make available for the consultation a catalog of digital information contents structured according to at least two hierarchical tree structures each comprising a respective hierarchy of nodes, each node corresponding to a respective category of digital information contents, in which the user apparatus is configured so as to perform the method according to any one of the preceding claims.

According to still another aspect of the present invention, a system is provided comprising:

at least one remote server system adapted to make available to users a catalog of digital information contents structured according to at least two hierarchical tree structures comprising each a respective hierarchy of nodes, each node corresponding to a respective category of digital information contents;

a user apparatus according to the preceding aspect of the invention.

BRIEF DESCRIPTION OF THE DRAWINGS

These and other features and advantages of the present invention will be made evident by the following detailed description of some embodiments thereof, description that will be provided merely by way of non limitative example and that will be conducted making reference to the attached drawings, in which:

FIGS. 3A and 3B are schematic flowcharts of the main operations for displaying, on a screen of a user apparatus, a subset of categories of a plurality of taxonomies of information contents, according to an embodiment of the present invention;

FIG. 13 is a table of correspondence of the functions of the actuators of FIG. 12 for the exploration of the categories of the different taxonomies displayed on the screen of the user apparatus;

FIG. 14 schematizes a technique of "swap" of the categories hosted in the selected sectors of the area of the screen according to an embodiment of the invention;

FIG. 15 schematizes a technique of change of position of the ideal planes hosting the different displayed taxonomies, depending on the category selected by the user, according to an embodiment of the present invention;

DETAILED DESCRIPTION OF EMBODIMENTS OF THE INVENTION

Figure 1:
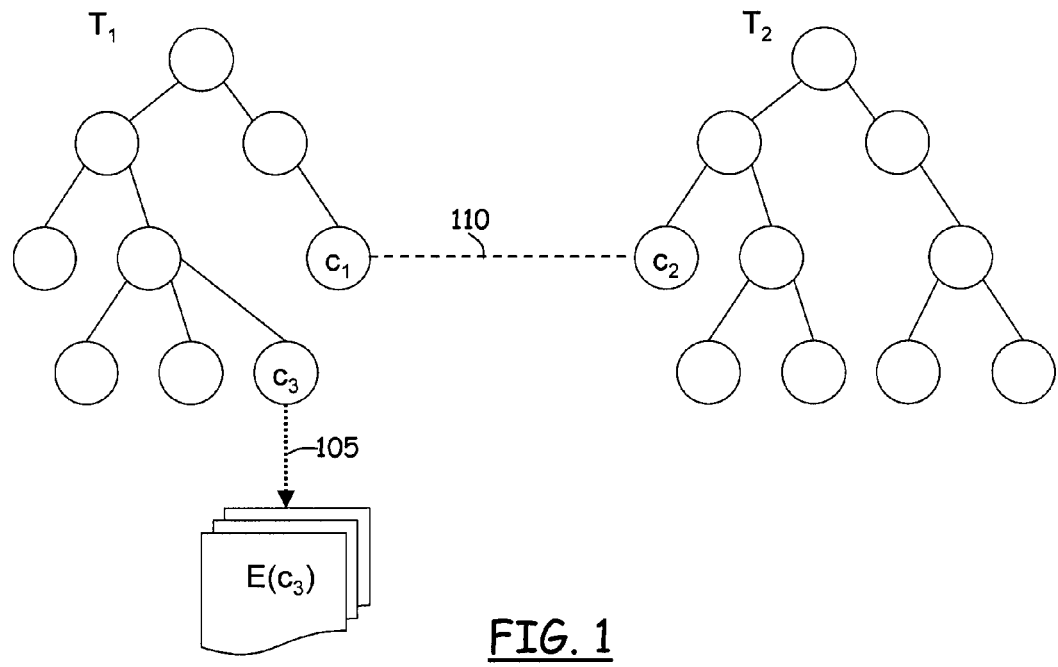
FIG. 1 schematically shows the structure of the data model used in an embodiment of the present invention.

The present invention proposes, according to one aspect thereof, a method for the representation and the interaction for the exploration, by a user, of a catalog of objects constituted in general by digital information contents, like for instance texts, books, music, photos, video, movies, files of various kind (e.g. programs for computer), the list of the types of the digital information contents not being exhaustive and not constituting a limitation for the present invention.

It is assumed that each object belonging to the catalog is uniquely identifiable through a respective identifier (or a surrogate thereof), that allows locating it and that allows accessing the object itself, i.e. the digital information content.

For the purposes of the present invention, it is defined "taxonomy" a hierarchical structure of concepts. A taxonomy is in particular represented by an acyclic interconnected graph; an acyclic interconnected graph is a graph in which all the nodes are connected through at least one arc, and in which no cycles exist, i.e. there are no paths, composed by arcs, that depart from and end in the same node of the graph.

A generic taxonomy T can in symbols be defined as: T=<V, E>, where V is the set of the nodes of the graph representing the taxonomy T, each of which represents a concept, and E is the set of the arcs between the nodes, each of saids arcs representing an asymmetrical relationship between the nodes at the ends of the arc: in other words, an arc that connects two nodes represents a non-reversible relationship between the nodes. For instance, a non-reversible relationship between two generic nodes n1 and n2 can be the following: n1 "is child of" n2, where the relationship "is child of" is the arc that connects the two nodes n1 and n2.

The more common relationships between the nodes of the graph that represents a taxonomy are: "IS-A" and "PART-OF". The concept (node of the graph) at the highest level in the hierarchical structure that represents the taxonomy is called "root"; the concepts (nodes of the graph) for which no outgoing arc exists are called "leaves".

Every concept in the generic taxonomy, i.e. every node of the graph that represents it, has associated a label that uniquely identifies it inside the hierarchical structure to which the concept belongs.

From the practical point of view, a taxonomy can be for instance compiled in a formal language represented by the standard XML (eXtensible Markup Language), or one of its extensions like RDF (Resource Description Framework) or OWL (Web Ontology Language). The type of language used for compiling the taxonomy does not constitute a limitation for the present invention.

Each concept of a given taxonomy represents one "category" of information contents, inside which some of the objects of the catalog, i.e. some of the digital information contents, are catalogued. The set of the objects listed under a specific category of the taxonomy is said "extension of the category". Given a category c belonging to a taxonomy T, his extension E(c) is defined as follows:

$$E(c) = (o_i : o_i \in I, I \subset O)$$

where O is the set of all the objects of the catalog, $o_i$ is the generic object of the catalog, and I is a proper subset of the set O.

Each category of a taxonomy contains a direct or indirect reference to the set of the objects belonging to its extension.

Depending on the chosen practical implementation, the individual objects of the catalog can be represented as individual instances of the category of the taxonomy to which they belong (this is for example possible if, for the compilation of the taxonomy, the language used is RDF or OWL) or they can reside in a database to which the categories make reference.

The method for cataloguing the objects in the taxonomies does not constitute a limitation for the present invention, being sufficient that, as result of the cataloguing, the hierarchical structures described above are obtained. In particular, the cataloguing of the objects of the catalog can be made manually or automatically exploiting a suitable algorithm.

An example of the above described data model is represented in FIG. 1. $T_1$ and $T_2$ are different taxonomies. $c_1$ and $c_3$ represent two generic categories of the taxonomy $T_1$, $c_2$ represents one of the categories of the taxonomy T2. Reference 105 denotes the extension $E(c_3)$ of the category $c_3$ of the taxonomy $T_1$, i.e. the set the objects of the catalog belonging to such category.

Relationships can exist between categories belonging to different taxonomies. A relationship has an associated intensity value and a verse. The relationships are dynamic, they can be born, die or dynamically change in time. Referring to FIG. 1, reference 110 denotes a relationship between the category $c_1$ of the taxonomy $T_1$ and the category $c_2$ of the taxonomy $T_2$ at the time t. Given the category $c_1$ belonging to the taxonomy $T_1$ and the category $c_2$ belonging to the taxonomy $T_2$, the relationship between the category $c_1$ and the category $c_2$ at the time t is symbolically defined as:

$$c_1 \xrightarrow{t} c_1 = w \in [0, 1]$$

where $c_1 \in T$, $c_2 \in T_2$ $T_1 \neq T_2$. The category $c_1$ is said "source category", and the category $c_2$ is said "destination category" of the relationship; w represents the intensity of the relationship between the two categories.

The method for the identification of the dynamic relationships between the categories belonging to different taxonomies does not constitute a limitation of the present invention, nor there are limitations on the number of such relationships.

The method according to an embodiment of the present invention for the representation and interaction aimed at the exploration, by a user, of a catalog of digital information contents organized in multi-taxonomic form, i.e. in two or more, in general in a plurality of taxonomies, is based on the data structure described above, and takes into account the characteristics and limitations of the user apparatuses intended to be used by the users for the representation and exploration of the catalog of digital information contents, in addition to being easy to use.

In the representation of catalogs of digital information contents, a suitable exploitation of the available space on the display device (screen, display and similar) of the user apparatus is important. Indeed, the size of the display devices of the user apparatuses used for the exploration of the catalog of information contents can be limited, like for instance in the case of the screens of the mobile telephones of new generation, a thing that limits the space explorable and recognizable by the user, while the number of the categories of the catalog of contents and their dynamic relationships that have to be displayed may be very high.

The method according to an embodiment of the present invention provides for a peculiar management of the space where to represent (to display) the categories of the catalog of contents. By means of an ordered organization of the available space on a display device (screen) of a user apparatus, a structure is defined suitable to host the categories belonging to the taxonomies of the catalog of contents and the relationships between them.

In the following, merely by way of example, reference will be made to the system schematically shown in FIG. 2, in which reference 205 denotes a television set of a user, connected, through an interactive set-top box 210 and a data network 215 like the Internet, to a server 220 devoted to make available to the users the digital information contents, for instance movies, textual and/or multimediali pages and the like. The interaction of the user with the television 205 takes place through a remote control 225. The digital information contents may be stored on the server 220, organized and listed according to the structure described above (i.e. in the form of a plurality of taxonomies), or the server 220 can just organize and catalog, according to the structure described above, digital information contents made available by one or more other servers (shown not) connected to the server 220 through the network 215.

In FIGS. 3A and 3B flowcharts are schematically shown of the main operations for the representation on the screen of the user apparatus, for instance of the television 205, of parts of taxonomies of concepts of the catalog of digital information contents, according to an embodiment of the present invention. The operations that will be described are intended to be performed by the user apparatus, for instance by the television and set-top box, through the execution of a suitable software. The user apparatus interacts with the server 220, accessing the catalog of digital information contents stored therein.

According to an exemplary and non-limitative embodiment of the present invention, the display device of the user apparatus is assumed to have rectangular shape (such as for instance the screen of a personal computer, of a cellular telephone or of a smart-phone, of a television, as in the example of FIG. 2 that will be hereinafter considered).

The bidimensional space available on the screen of the display device is divided in zones of pertinence, within which the elements to be displayed will be positioned. The elements that populate the available space on the screen of the display device are in particular the icons representing the categories belonging to different taxonomies of the catalog, and their mutual relationships.

As described in the foregoing, each taxonomy of the catalog of contents is a set of categories (each one representing a concept) of digital information contents, the categories being organized in a hierarchy. A hierarchy of categories can potentially be very deep, i.e. the number of its levels can be very high. The complete representation of a very wide structure may not be achievable in a space of limited dimensions like the screen of a user apparatus such as a television, and although many levels of the hierarchy may also be represented simultaneously, the user accessing it would however have a view limited to a subset of categories.

For this reason, according to an embodiment of the present invention it is provided that of each taxonomy of the catalog to be displayed on the screen of the user apparatus, only a selected subset of its categories is displayed, the categories of said belonging to a limited number of levels of the hierarchy (i.e., one "sub-hierarchy"). The number of levels of the sub-hierarchy that is displayed is for instance predetermined.

Figure 4:
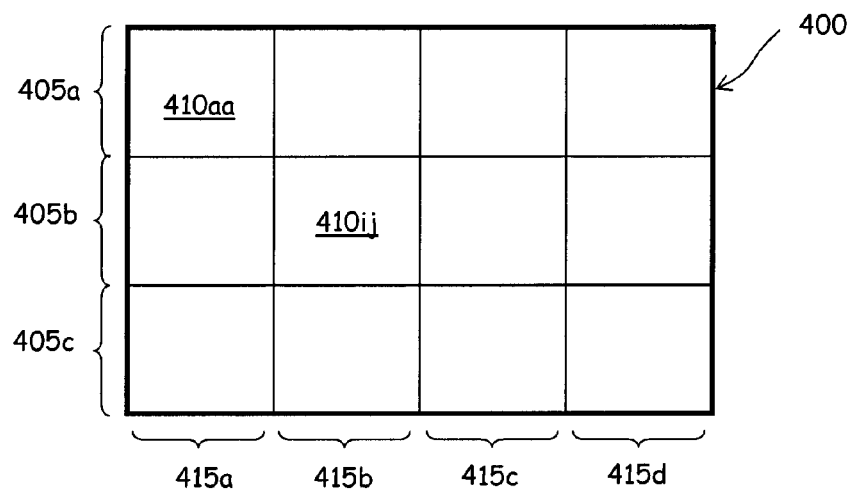
FIG. 4 shows a subdivision of the screen of the user apparatus in bands corresponding to different hierarchical levels of a sub-hierarchy of categories of a taxonomy to be displayed, and in sectors destined to host the categories to be displayed.

First of all (block 305), the available area on the display device of the user apparatus is divided in sub-areas corresponding to a limited number L of levels, said number being equivalent to the predetermined number of levels of the sub-hierarchies. For instance, with reference to FIG. 4, reference 400 denotes the screen of the display device of a user apparatus, like for instance the screen of the television 200, or the screen ("display") of a cellular telephone, or of a monitor of a personal computer. In the shown example, the area of the screen 400 is ideally divided into a predetermined number, for instance three, sub-spaces, in the example constituted by horizontal bands 405a, 405b and 405c, each band corresponding to one of three levels of the sub-hierarchies to be represented on the screen 400 (level 1—father, level 2—children and level 3—nephews). Each band 405a, 405b and 405c into which the screen 400 is ideally divided is intended to host categories of a taxonomy belonging to the same level of the same sub-hierarchy. Adjacent bands contain categories with relationships "IS-A" or "PART-OF".

Each one of the sub-areas into which the available area on the screen 400 of the display device is divided and assigned to a respective hierarchical level is subsequently divided into sectors 410ij (for instance, horizontally on four columns—column 415a, column 415b, column 415c, column 415d); each sectors can host a category belonging to the related hierarchical level (block 310).

The described structure is adapted to host a subset of categories belonging to a taxonomy. The subdivision of the area of the screen in bands corresponding to hierarchical levels allows to represent in direct way the different degrees of generality of the different categories. In the example in FIG. 4, the more general categories (at the highest hierarchical level of the sub-hierarchy represented on the screen at a certain time) will be distributed in the sectors of the band 405a, the more specific categories will be distributed in the sectors of the bands 405b and 405c corresponding to the lower hierarchical levels of the sub-hierarchy. In this way the display of the hierarchy is limited to a limited number of levels of depth.

Figure 5:
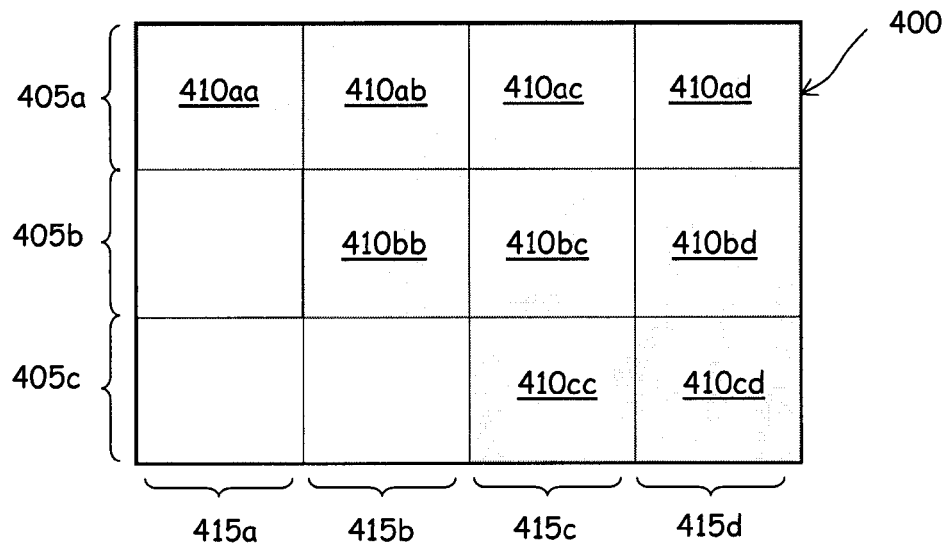
FIG. 5 shows a possible selection of the available sectors.

The selection is then made of the sectors 410ij destined to host the categories of the sub-hierarchy to display (block 315). Each level of the sub-hierarchy to be displayed can be crowded (for instance, in a taxonomy related to the information contents inherent to a main town of a province of medium dimensions, the number of daughter categories of the father category corresponding to the town can be of some hundred, including the set of the other towns and municipalities present on the territory of the province). According to the present invention, the number of categories that can be simultaneously displayed on the screen 400 is upperly limited to the number of sectors into which the area of the screen 400 has been divided. Beginning from the more general hierarchical level (band 405a), and going down to the more specific hierarchical levels (bands 405b and 405c), the sectors destined to host the categories of the sub-hierarchy are selected. Preferably, in order to improve the visibility of the user, an sector below the first selected sector of any band corresponding to the immediately upper hierarchical level is not selectable. In FIG. 5 an example is schematically shown of the selection of the sectors to be used for displaying the categories of a sub-hierarchy to be represented (the selected sectors, shown as shaded, are the sectors 410aa, 410ab, 410ac, 410ad, 410bb, 410bc, 410bd, 410cc and 410cd).

Figure 6:
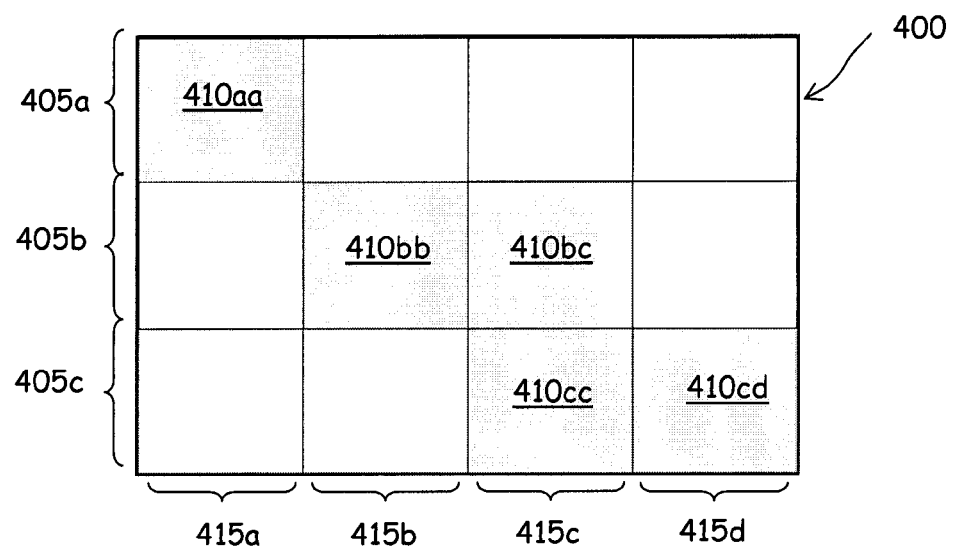
FIG. 6 shows a reduction of the number of sectors used for displaying the categories, in an embodiment of the present invention.

To decrease the degree of complexity and to improve the fruition of the representation of the categories of information contents, it can be foreseen to further reduce the number of sectors to be used for displaying the categories for every band 405a, 405b and 405c, i.e. for every hierarchical level of the sub-hierarchy, with respect to the number of potentially available sectors. FIG. 6 shows an example of selection of a subset of the sectors destined to host the categories: the selected sectors are the sectors 410aa, 410bb, 410bc, 410cc and 410cd (still depicted as shaded). For example, it may be provided for exploiting a number of sectors such as to occupy less than half of the available screen for all the levels of the sub-hierarchies to be displayed on the screen higher than a predetermined level, for instance with respect to the FOCUS category as defined in the following. More preferably, the number of sectors to be used is not increasing—for all the levels of the sub-hierarchy higher with respect to a predetermined level (for instance with respect to the FOCUS category as defined in the following) with respect to the distance between the considered level and said predetermined level. In this way, it is possible to have free space on the screen that is exploited for showing the alternative taxonomies in the way that will be described in the following.

Then, the (icons of the) categories to be displayed are inserted in the selected sectors destined to host them (block 320). Given a sub-hierarchy to be displayed, and selected, as described above, the sectors of the screen destined to host its categories, the set, or a subset, of the categories belonging to the given sub-hierarchy is mapped on the selected sectors 410aa, 410bb, 410bc, 410cc and 410cd. Each selected sector 410aa, 410bb, 410bc, 410cc and 410cd can contain at most one category. The categories are inserted into the selected sectors associated with the correspondings hierarchical levels. The displayed categories belong to the displayable sub-hierarchy extracted from the selected taxonomy (as described in detail in the following); additionally, given a hierarchical level of the sub-hierarchy, the category contained in the first hosting sector of that level is the only predecessor category of the categories of the following level: in other words, the categories inserted in a level can only be those that have in common the more generic category (father) that is inserted in the first hosting sector of the preceding level. The choice of the subset of categories at the same level, apart from the above-mentioned restrictions, may be arbitrary; if the number of children categories of a certain category is greater than the number of available hosting sectors, the subset of the children categories represented on the screen is for instance arbitrary.

The categories belonging to the identified sub-hierarchy and not associated with a sector among those selected for the visualization are preferably made accessible through a mechanism of "swap" of the sectors, that will be described in detail in the following.

Figure 7:
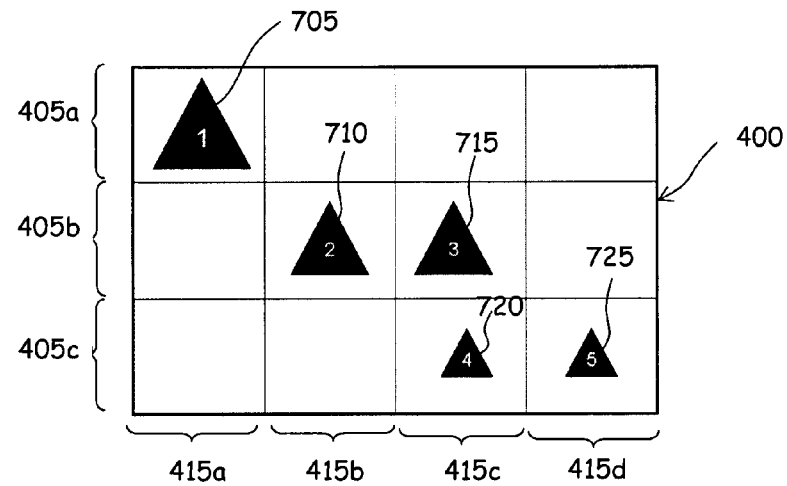
FIG. 7 schematically shows a disposition, within the selected sectors of the screen, of icons corresponding to categories of a sub-hierarchy.

The categories are displayed on the screen 400 (in the proper selected sectors) by means of icons. Preferably, to underline the fact that the categories belong to different hierarchical levels, the icons used for representing categories belonging to different hierarchical levels have different size; for example, the more general categories are represented by means of icons of bigger size in comparison to the most specific categories. In FIG. 7 there is shown an example of display of the categories on the screen 400, that adopts triangular icons for each category. On the level 1 (band 405a) the father category 705, on the level 2 (band 405b) two children categories 710 and 715, on the level 3 (band 405c) two nephew categories 720 and 725. The icons have increasing size depending on the degree of generality of the category: as it can be seen in the figure, the triangle related to the father category 705 is bigger than the triangles of the categories 710 and 715 on the level 2, that have in turn bigger size than the triangles representing the categories 720 and 725 on the level 3, having a greater degree of specificity.

Once the icons of the categories 705-725 to be displayed are inserted in the proper sectors, the relationships between the categories are inserted (block 325). Given a sub-hierarchy hosted in the display area of the screen 400 organized as described in the foregoing, the static relationships (of the type "IS-A" and "PART-OF") that link the father/children categories belonging to the hierarchy are considered. The model provides for the display of such relationships as connections between the categories of the displayed sub-hierarchy, as exemplified in FIG. 8. The father/child relationship is represented as a connection between the category of the more general level (father) and the closest child category, like the connections 805 and 810 shown in FIG. 8. The relationships between the father category and the other children categories are represented by connections between adjacent children, like the connections 815 and 820 shown in FIG. 8 (as already mentioned, the method according to an embodiment of the invention provides that only one category for each level has the children categories of the following level displayed).

A method will now be described according to an embodiment of the present invention for the selection of the sub-hierarchy to be displayed within a selected taxonomy, i.e. for the choice of the portion of taxonomy to be displayed on the screen 400 of the user apparatus. The main operations are schematized in the blocks of the flowchart of FIG. 3B.

Figure 8:
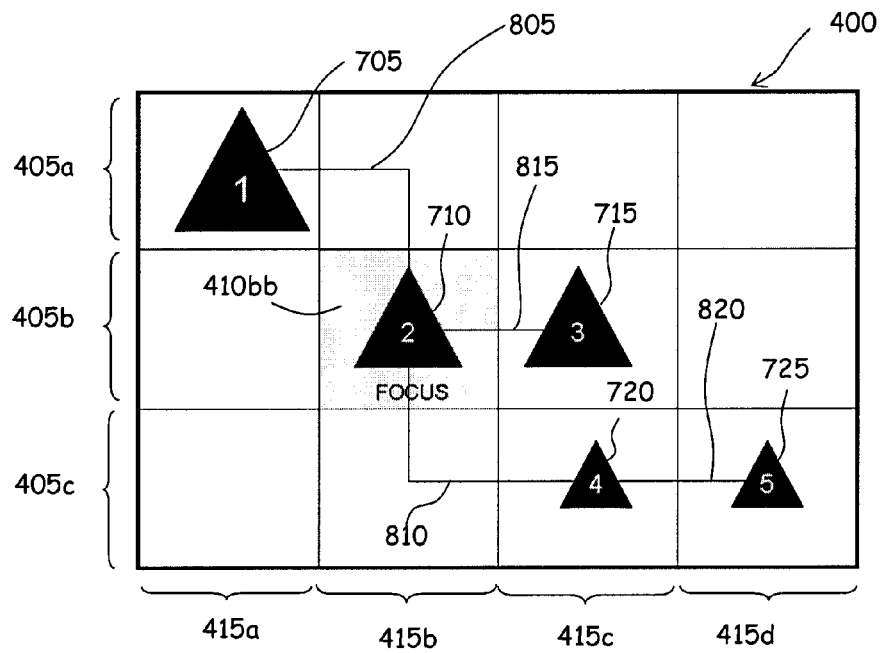
FIG. 8 schematically shows the insertion of relationships between the categories displayed on the screen.

In the representation on the screen of the user apparatus, it is labeled "FOCUS" the category of a given taxonomy beginning from which the categories belonging to the sub-hierarchy that can be displayed on the screen 400 are selected; referring to the example of FIG. 8, the category labeled "FOCUS" is the category 710.

The FOCUS category is thus chosen (block 330). The choice of the initial FOCUS category can be arbitrary, and it may for instance depend on the context of use; for example, in the case of digital information contents constituted by television programs, the FOCUS category initially chosen could correspond to the category to which the television program currently viewed by the user belongs.

Once the choice of the FOCUS category of a taxonomy currently selected has been made, a sub-hierarchy of the taxonomy is created that can be displayed (block 335).

A displayable sub-hierarchy is, as already mentioned, limited to a number of hierarchical levels default. Given a taxonomy T, one category f thereof chosen as FOCUS category and a number I of levels, let P be the set of the predecessors of the FOCUS category f, defined as:

$$P(f, l_i) = \begin{cases} se & l_i = l_f - 1 & padre(f) \\ se & l_i < l_f - 1 & \{P(P(f, l_{i+1}), l_i)\} \end{cases}$$

S the set of the descendants of the FOCUS category f, defined as:

$$S(f, l_i) = \begin{cases} se & l_i = l_f + 1 & figli(f) \\ se & l_i > l_f + 1 & \{c: c \in S(S(f, l_{i-1}), l_i)\} \end{cases}$$

and B the set of the brother nodes of the FOCUS category f:

$$B(f) = \{b : l_b = l_f\}$$

the sub-hierarchy (or portion of taxonomy) T' that can be displayed on the screen of the user apparatus is defined as:

$$T' = f \cup B\{f\} \cup \{c \in P(f, l_i) : \forall l_j - (L/2) < i < l_f\} \cup u \{c \in S : \forall l_i, l_f < i < l_f + (L/2)\}$$

where L is the number of available sub-areas on the screen corresponding to different levels of the sub-hierarchy.

In essence, according to an embodiment of the present invention, the sub-hierarchy that can be displayed on the screen of the user apparatus is built, beginning from the selected FOCUS category, by taking a first number of categories of the taxonomy T at immediately higher hierarchical levels with respect to the hierarchical level of the selected category, and taking a second number of categories of the taxonomy T at immediately lower hierarchical levels with respect to the selected category.

According to an embodiment of the present invention, the (icon of the) category selected as FOCUS is put in the sector of the area of the screen 400 closest to the center of the available display area on the screen (the sector 410bb of the central band 405b in the example of FIG. 8—block 340). Beginning from the category selected as FOCUS, the other categories of the sub-hierarchy to be displayed are chosen and positioned (block 345).

Referring again to the example of FIG. 8, after selecting the category belonging to the taxonomy that has to occupy the "central" position destined to category selected as FOCUS (category 710, in the example), also the other (four, in the considered example) elements of the sub-hierarchy are positioned in the sectors of area of the screen 400 selected as described above: in the selected sector of the band 405a (corresponding to the higher hierarchical level of that of the category 710) the category 705 immediately more generic of the considered taxonomy, in a selected sector of the band 405b adjacent to the sector 410bb destined to host the category selected as FOCUS, the category 715 at the same hierarchical level (i.e. with the same degree of specificity) of the FOCUS category 710 and closest to the latter, and in the selected sectors of the immediately lower band 405c the categories 720 and 725 at the lower hierarchical level of that of the FOCUS category 710. Given this disposition, if the category selected as FOCUS represents the most generic node of the graph representing the hierarchy of reference, no "father" nodes will be displayed in the selected sectors of the higher band 405a, while if the category selected as FOCUS is the most specific node of the hierarchy to which it belongs, no other categories will be displayed in the selected sectors of the lower band 405c.

According to the present invention, there is provided to display, on the screen of the user apparatus, two or more, in general an arbitrary number of different taxonomies, between the categories of which dynamic relationships exist. Each taxonomy is represented using the method described in the foregoing (block 350).

To maximize the exploitation of the available space on the screen 400 of the user apparatus, according to an embodiment of the present invention the mechanism described below is exploited.

Figure 9:
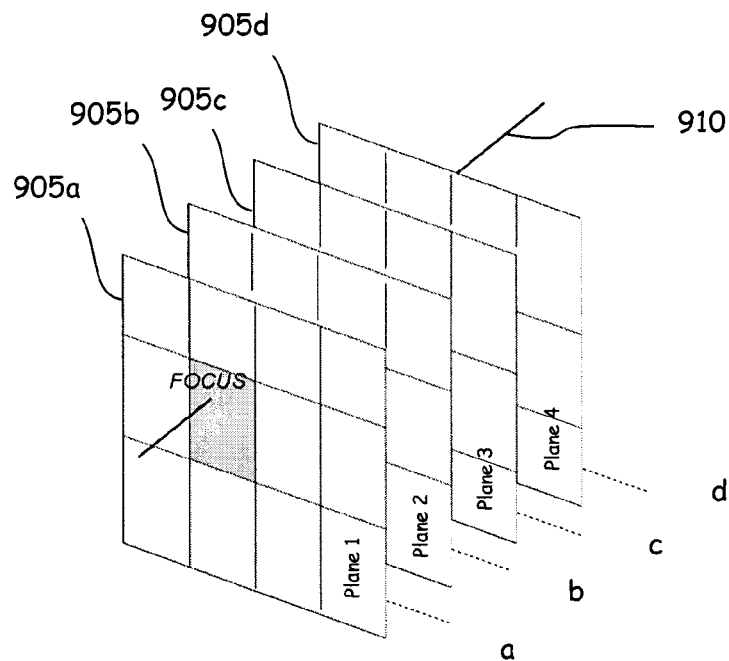
FIG. 9 schematizes a technique according to an embodiment of the present invention for displaying sub-hierarchies of a plurality of different taxonomies.

Each taxonomy to be displayed is represented on a respective plane of a plurality of parallel planes arranged in sequence along an axis 910, as schematized in FIG. 9, in which it is assumed by way of example that the taxonomiess that can simultaneously be displayed on the screen is four, on the different planes 905a, 905b, 905c and 905d. Each plane of the plurality of parallel planes occupies a respective position in the sequence of the planes; in FIG. 9, the frontal position is defined a, and the remaining three positions, in succession, are defined b, c and d. Each plane on which a taxonomy is displayed is divided in sectors, as described in the foregoing (FIGS. 5-8). Different taxonomies belong to different planes, arranged in one of the available positions a, b, c, d. In the final representation on the screen 400 of the user apparatus, the different planes are melt in a single bidimensional plane, since the point of view of the user is the frontal one.

The planes from time to time displayable on the screen 400 are those that host the taxonomies wherein at least one category in relationship with the category selected as FOCUS category of the taxonomy currently selected exists. Therefore, not all the planes are necessarily present at a certain time in the representation on the screen 400.

To optimize the available space on the screen 400 of the user apparatus and to avoid excessive overlaps among the categories of the different displayed taxonomies, according to an embodiment of the present invention a rotation is made of each one of the planes 905a, 905b, 905c and 905d, with respect to the central point of the same plane, of a prescribed, respective angle α; defined as j the generic plane, the angle of rotation of the plane is:

$$\alpha = (j - 1) \cdot \frac{360}{\text{number\_of\_taxonomies}}$$

Such rotation is defined and is invariant with respect to the change of the order of the planes in the sequence (change that takes place during the exploration to the categories, as described subsequently), or of the order of occupation by the different planes of the different available positions a, b, c, d.

Figure 10:
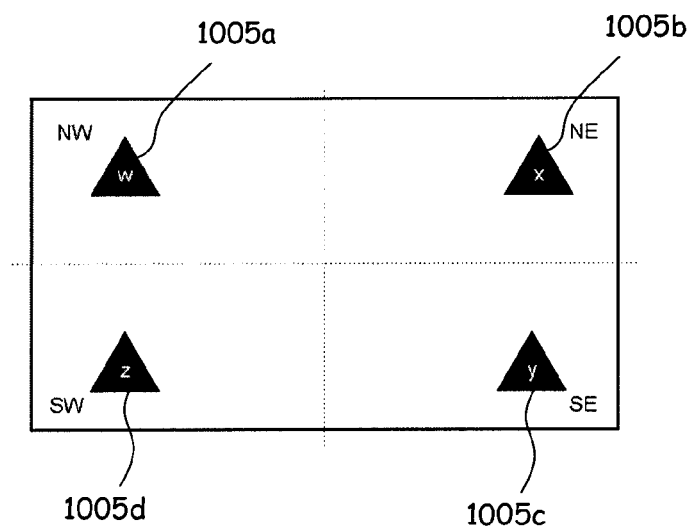
FIG. 10 schematizes the result of a technique for the optimization of the area of the screen for displaying the plurality of taxonomies.

For instance, providing for displaying on the screen 400 of the user apparatus up to four different taxonomies, as in the example of FIG. 9, the angle of rotation of each plane 905a, 905b, 905c and 905d with respect to the other is preferably equal to 90°; this allows subdividing the available space on the screen 400 in four quadrants, as shown in FIG. 10. In such a way, the first more general category 1005a, 1005b, 1005c, 1005d of the selected sub-hierarchy of each of the taxonomies displayed on the screen 400 occupies the position in one of the quadrants NW, NE, SE, SW.

In case the number of taxonomies that can be displayed (and thus the planes destined to host them) is higher than four, it is for instance possible to assign the same angle of rotation to two or more planes; for instance, in the case of five planes, the fifth plane can have an angle of rotation of 0° like the first plane. In this case, it is preferable to display a subset of cardinality smaller or equal to 4 of such planes, avoiding to include planes with the same angle of rotation.

The taxonomy currently selected is the one that, at a certain instant, is hosted in the plane that occupies the frontal position (position a in FIG. 9).

Based on the existing dynamic relationships between different categories, the selection of the displayable sub-hierarchies of each taxonomy takes place using the relationships that have as source category the category selected as FOCUS of the taxonomy currently selected.

The order of the planes hosting the different taxoniess or the order of occupation of the different positions a, b, c and d by the different planes 905a, 905b, 905c and 905d, and of the taxonomiess displayed therein, can vary in the time: the FOCUS category whose dynamic relationships are considered for determining the sub-hierarchies of the other taxonomies to be displayed is preferably the one belonging to the taxonomy currently selected.

In the remaining taxonomies to be represented, each category destination of the relationship with the FOCUS category of the taxonomy currently selected (at most one for taxonomy) is in turn selected and labeled as FOCUS category for the taxonomy that contains it, allowing the proper selection of the displayable sub-hierarchy, as described in the foregoing.

Figure 11:
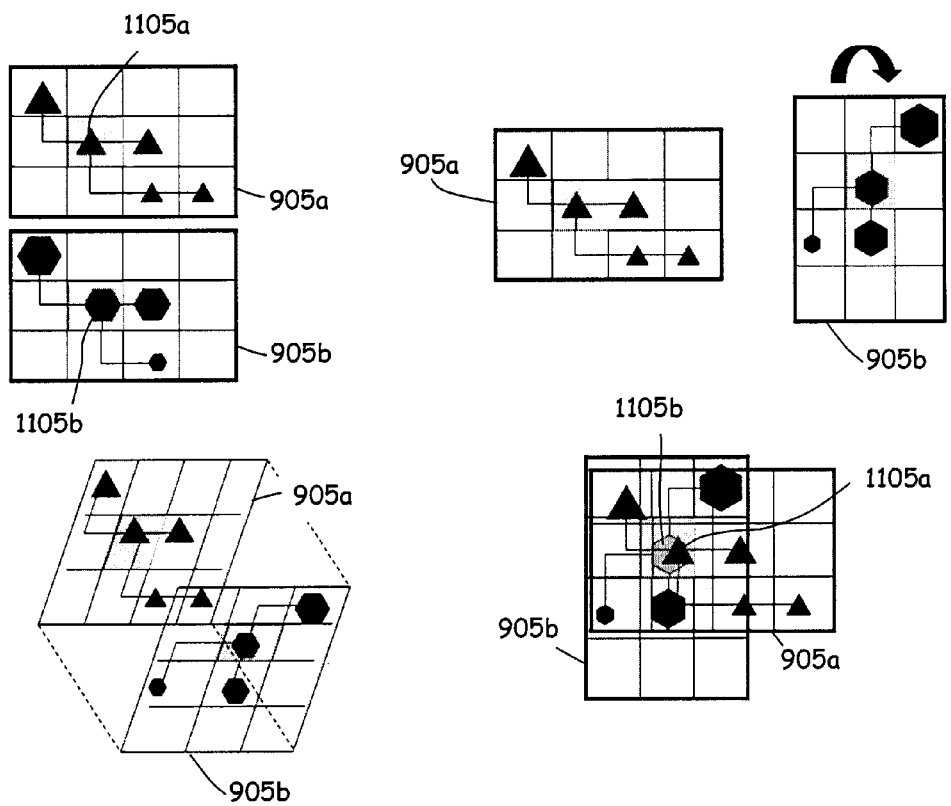
FIG. 11 exemplifies a technique of rotation and overlap of ideal planes containing different taxonomies to achieve the result of FIG. 10.

The order of occupation, by the remaining planes, of the positions b, c, d following the frontal position preferably depends on the intensity w of the relationship between the FOCUS category of the taxonomy currently selected, hosted in the plane 905a in the example of FIG. 9, and the FOCUS category of the other taxonomies, hosted in the respective planes 905b, 905c, 905d. The planes 905b, 905c, 905d will occupy positions which are more distant from the frontal position a occupied by the plane 905a the lesser intense is the relationship of their FOCUS category with the FOCUS category of the taxonomy currently selected. In such a way, in the representation on the screen 400, all the categories correlated to the FOCUS category of the taxonomy currently selected will be visualized in sectors occupying substantially coincident positions on the screen, as visible in FIG. 11, where the rotation mechanism of the planes is schematized limitedly to the two planes 905a (assumed to host the taxonomy currently displayed) and 905b; the category 1105a selected as FOCUS of the taxonomy hosted in the plane 905a and the category 1105b that, based on what described in the foregoing, constitutes the FOCUS category of the taxonomy hosted in the plane 905b occupy, in the final display on the screen 400, a same zone of the screen. The icons used for representing the categories of the two taxonomiess can have different shape.

According to an embodiment of the present invention, for the exploration of the catalog of information contents, the user imparts commands to the user apparatus. Such commands can be for instance mapped on a set of actuators. The actuatorss can for example be, depending on the specific user apparatus, keys of a remote control of the user apparatus (e.g., in the case of a television), or keys of a keyboard of personal computer or of a cellular telephone.

The number of actuators can advantageously be small; for example, in an embodiment of the present invention, ten actuators are sufficient (this is for instance the case where it is assumed that up to four different taxonomies are to be displayed; in general, the number of actuators necessary for the exploration of the catalog of information contents depends on the number of taxonomies that it is desired to be able to display, and therefore on the number of planes destined to host them). Thanks to this, the exploration of a catalog of information contents even very complex can be achieved also through user apparatuses having man/machine interfaces with a limited number of keys (for instance, a remote control or the keyboard of a cellular telephone).

Figure 12:
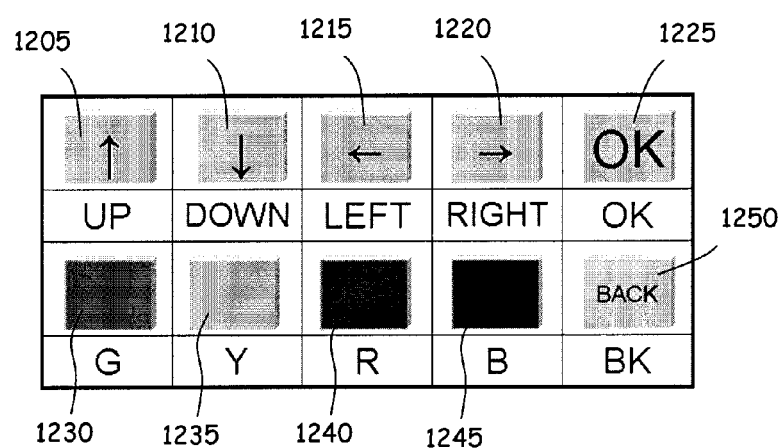
FIG. 12 schematically shows a set of actuators, for instance keys of a remote control of a user apparatus, adapted to allow the user exploring the catalog of digital information contents, in an embodiment of the present invention.

In FIG. 12 an exemplifying list of actuators is schematically shown suitable to be used for the exploration of the catalog of digital information contents. The label of the generic actuator is purely exemplary. The actuators can for example, as mentioned, be keys of a remote control for the television or the set-top box connected thereto. Particularly, four actuators 1205, 1210, 1215 and 1220 allow respectively the shift, upward, downward, leftward and rightward, of the point or zone of selection on the screen 400; an actuator 1225 allows the user to input a selection command, for example for the selection of a category for accessing the contents cataloged therein; four actuators 1230, 1235, 1240 and 1245, corresponding for instance to keys of different color of a remote control, allow the selection of the four different taxonomies displayed (and thus of the four planes 905a, 905b, 905c, 905d); an actuator 1250 generically allows the return to a preceding condition.

As described in the foregoing, the taxonomy currently selected is that hosted in the plane in frontal position a. The FOCUS category of the taxonomy currently selected is that on which there is the control and the contents cataloged therein can be accessed. Through the selection actuator 1225, it is possible to access the list of the contents cataloged in the FOCUS category of the taxonomy currently selected (i.e. the extension of the FOCUS category). The display of such list and the access to its elements can be accomplished in various ways, and do not constitute a limitation of the present invention.

Given the taxonomy currently selected, it is possible to directly explore the categories connected to the FOCUS category thereof, by using the actuators 1205, 1210, 1215 and 1220. A category is directly connected to another if it belongs to the same sub-hierarchy and, in the display on the screen 400, a connection exists between the two categories (referring to the example of FIG. 8, the categories 705, 715 and 720 are for instance directly connected to the category 710). The actuators 1205, 1210, 1215 and 1220 to be used for the exploration of the categories directly connected to the FOCUS category of the taxonomy currently selected, at the hierarchical level corresponding to that of the FOCUS category, depend on the angle of rotation of the plane that hosts the taxonomy currently selected, and thus the actuators to be used vary depending on the angle of rotation of the plane hosting the taxonomy currently selected, as summarized in the table of FIG. 13, in which the level j identifies the hierarchical level of the FOCUS category, the level j−1 that of the hierarchically higher category, the level j+1 that of the children categories of the FOCUS category. In case one or more categories directly connected to the FOCUS category of the taxonomy currently selected do not exist, the related actuator is inhibited.

The access to a category directly connected to the FOCUS category of the taxonomy currently selected does not determine a change of the taxonomy currently selected, but modifies the category FOCUS thereof: the accessed category becomes the new FOCUS category of the considered taxonomy. This impacts the represented sub-hierarchy, that is modified, and can also be reflected on the representation of the other displayed taxonomiess, whose respective FOCUS category was connected by a relationship (being the category destination of such relationship) to the previous FOCUS category of the taxonomy currently selected. In other words, the change of the FOCUS category of the taxonomy currently selected potentially changes the whole multi-taxonomic representation, because it acts as pivot on which the represented sub-hierarchies of all the taxonomies depend.

According to an embodiment of the present invention, a "swap" mechanism is foreseen in the case of exploration of the brother categories of the FOCUS category (i.e. of the categories at the same hierarchical level of the FOCUS category) in case the number thereof is greater than the number of the available hosting sectors for that hierarchical level (i.e. of the selected sectors of the central band 405b). The swap mechanism, exemplified in FIG. 14, provides that such categories cyclically occupy the available hosting sectors of the level when the FOCUS category changes (one category at a time will occupy the sector reserved for the FOCUS category). Referring to the example of FIG. 14, the initial situation is shown at the top left of the figure; the FOCUS category of the selected taxonomy is indicated as 1, and, in the sectors of the same hierarchical level, the brother categories 2 and 3 are displayed, while the remaining brother categories 4 and 5 are not displayed; by accessing, through the actuator 1220, the brother category 2 (as shown at the top right of the figure), this becomes the FOCUS category, so that it is displayed in the sector 410bb that previously hosted the category 1; in the sectors 410bc and 410bd available at the same hierarchical level (band 405b) the brother categories 3 and 4 are now displayed, while the categories 5 and 1 are not displayed. Selecting then, still through the actuator 1220, the category 3, the latter becomes the new FOCUS category; it is thus displayed in the sector 410bb that oreviously hosted the category 2, and in the sectors 410bc and 410bd available at the same hierarchical level the categories 4 and 5 are now displayed, while the categories 1 and 2 are not displayed.

According to the present invention, it is possible to explore categories belonging to different taxonomies beginning from the taxonomy currently selected, on which there is the control (through the actuators). As described in the foregoing, the displayed taxonomies are those in which a category exists that is destination category of a relationship that has as source category the current FOCUS category of the taxonomy currently selected; such destination category, for its taxonomy, takes the role of FOCUS category.

The multi-taxonomic exploration provides that it is possible to access any of the FOCUS categories of other taxonomies connected to the current FOCUS category of the taxonomy currently selected, through the use of just one actuator. Particularly, the actuators 1230, 1235, 1240 and 1245 are dynamically associated with the taxonomiess visible at a certain instant, according to any association strategy.

The use of any of these actuators 1230, 1235, 1240 and 1245 causes the current FOCUS category to become that of the taxonomy hosted in the plane mapped to the corresponding actuator, and the taxonomy that contains such category to become the taxonomy currently selected, conditioned to the fact that, in the display, the considered taxonomy existed and thus its FOCUS category was in relationship with the FOCUS category of the taxonomy previously selected. The change of selected taxonomy causes the movement of the plane that contains it to the frontal position a, as schematized in FIG. 15. On the left, an initial condition is shown, in which the taxonomy currently selected is that hosted in the plane 905a, in frontal position a. In the center, there is shown the change of FOCUS category from that of the taxonomy hosted in the plane 905a to that of the taxonomy hosted in the plane 905d; as shown on the right, the taxonomy hosted in the plane 905d becomes the taxonomy currently selected, and the plane that hosts it is shown in frontal position a; the planes hosting the remaining taxonomies, having at least one category destination of a dynamic relationship with the new FOCUS category (in the example, the taxonomies hosted in the planes 905b and 905a) redistribute in an order that depends on the intensity of such relationship; in the example, in the final situation the taxonomy hosted in the plane 905c is no longer displayed, since in it no category is destination of a relationship with the FOCUS category of the new taxonomy currently selected. In other words if, for instance, the taxonomy Z is hosted on the plane mapped with the actuator Y, the use of the actuator will make taxonomy Z to become the new selected taxonomy and his FOCUS category the new FOCUS category.

According to an embodiment of the present invention, the dynamic relationships existing between categories belonging to different taxonomies is also exploited for the exploration of the catalog of information contents in the reverse sense to the direction of the relationship. Particularly, an access mechanism to the path of exploration and visit of the categories is provided for, that allows a random access to any FOCUS category previously accessed by the user. The visit path is intended within a same exploration session of the catalog of information contents, i.e. in the time interval between the turning on of the user apparatus and its turning off by the user. The FOCUS categories previously explored by the user are collected in an ordered list, accessible through the actuator 1250. Repeatedly using the actuator 1250, the user can view such list one FOCUS category at a time. The selection of one determined FOCUS category previously explored modifies the multi-taxonomic display on the screen 400, bringing it back to a previous display. To reactivate the control on the desired FOCUS category, when it is selected from the list, the actuator 1230 is used. From this point on, the normal interaction model returns to be valid.

In an alternative embodiment of the present invention, usable in the case of a user apparatus provided with a touch-screen, the commands to allow the user exploring the catalog of contents are imparted by having the usert touch the screen in the different zones thereof and in different ways. The coordinates of the touched zone of the screen are detected by the screen and sent to the apparatus to which the screen is connected, for instance, a personal computer or a smart-phone. A program executed by the apparatus will use the coordinates of the point touched by the user to understand which category, among those currently displayed, the user intends to "activate". The effect of activating a category depends on the context in which the activated category is, as described subsequently. The user is also able to make a double click on a category ("double activation"), touching twice in fast temporal succession the part of the screen in which the same category is displayed.

This model of interaction, alternative compared to that described previously, is described listing only the differences with respect to the basic model:

The access to the contents of the FOCUS category of the taxonomy currently selected can take place through a "double activation" of the same category.

The exploration of the categories of the currently displayed taxonomies (both that currently selected and those not selected) takes place by directly activating the category of interest, touching once the point of the screen in which the category is displayed.

Figure 16:
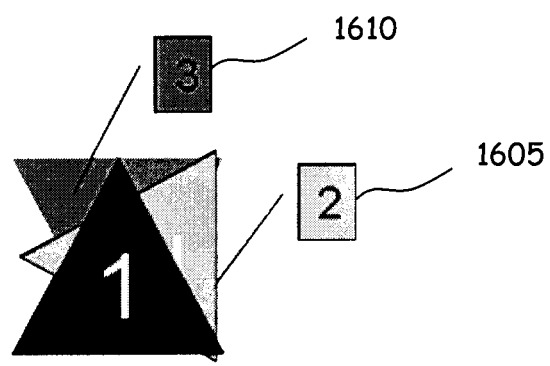
FIG. 16 shows a solution according to an embodiment of the present invention for simplifying the operation of selection of a displayed category in the case of a user apparatus having a touch screen.

The multi-taxonomic exploration takes place by activating the FOCUS category of the taxonomy T that it is desired to reach. Since it may not be simple, for a user, to touch the correct part of the screen for activating a FOCUS category of a taxonomy not coincident with the taxonomy currently selected, being the FOCUS categories of all the displayed taxonomies at least partly superimposed (the degree of overlap depending on the shape of the icons chosen to represent them), it is preferable to provide additional appendixes for the icons that projects from the FOCUS categories of the taxonomies underlying the current one and that facilitate the activation of such categories by the user, as schematized by the appendixes 1605 and 1610 in FIG. 16.

Two effects are produced by the activation of the FOCUS category of the taxonomy T:

the current FOCUS category becomes that of the taxonomy T;

the selected taxonomy becomes the taxonomy T.

The access to the visit path, contained in an ordered list of the previously accessed FOCUS categories, can take place by activating the FOCUS category to which the user desires to go back.

EXAMPLE

In order to further clarify the method according to the present invention, hereinafter a practical application example is provided and described.

The considered example concerns a catalog of digital audio/video contents organized in the followings four exemplifying taxonomies: GEOGRAPHY, HISTORICAL EVENTS, SPORT, TYPOLOGY OF CONTENT. In the example that will be described, reference will also be made to the "map of subway" conceptual model as a metaphor of navigation for the user.

Figure 2:
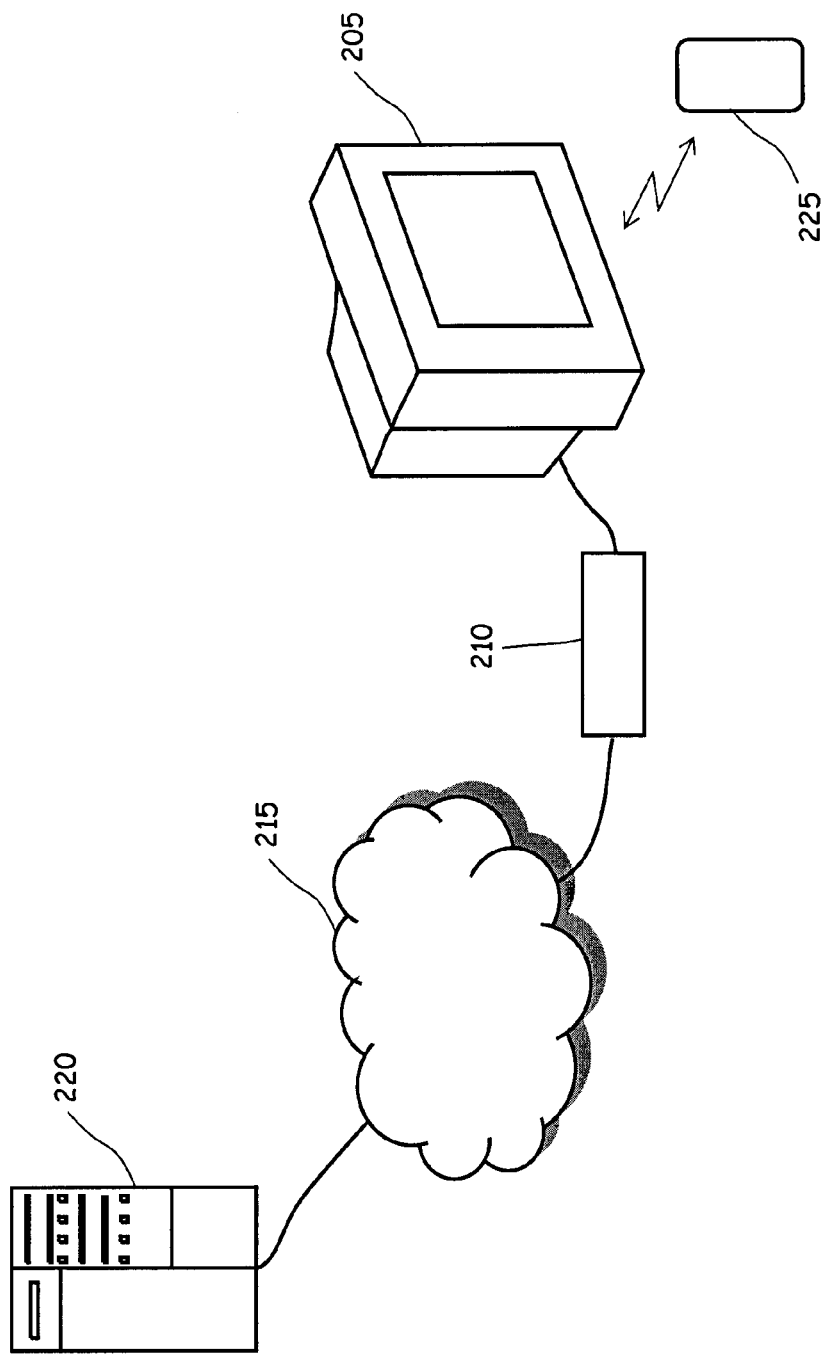
FIG. 2 shows an example of a system for the exploration, by a user, of a catalog of digital information contents, according to an embodiment of the present invention.
Figure 17:
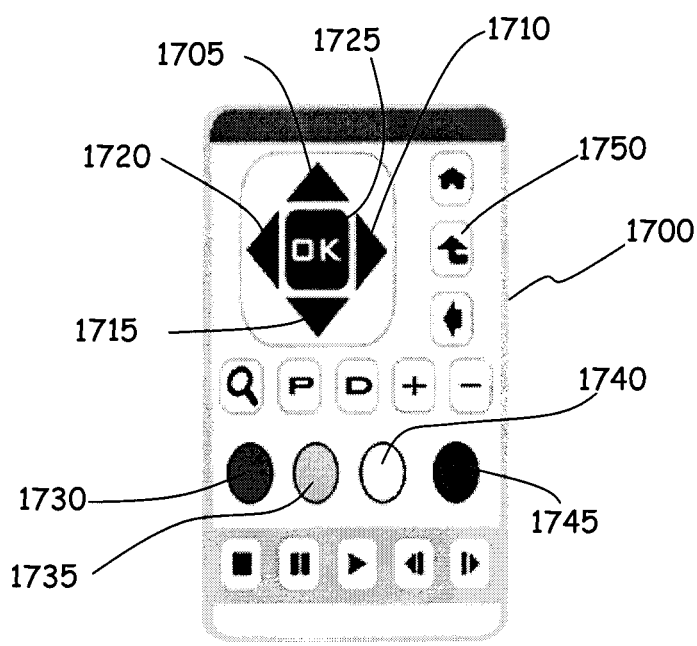
FIG. 17 schematically shows a remote control of a television set used by the user for the exploration of the catalog of digital information contents.

Let it be assumed that the user apparatus used for the exploration of the catalog of information contents is a television, as represented in FIG. 2, with which the user interacts through the keys (actuators) of a standard remote control as that schematically shown in FIG. 17. The remote control 1700 has arrow keys 1705, 1710, 1715, 1720, an enter or selection key ("OK") 1725, four color keys 1730, 1735, 1740 and 1745 and a back key 1750. These keys correspond to the actuators shown in FIG. 12 and previously described.

The example that will be described shows how, using the method according to the present invention, it is possible to explore the categories of the taxonomies and possibly to access the contents of the catalog classified under said categories.

Figure 18:
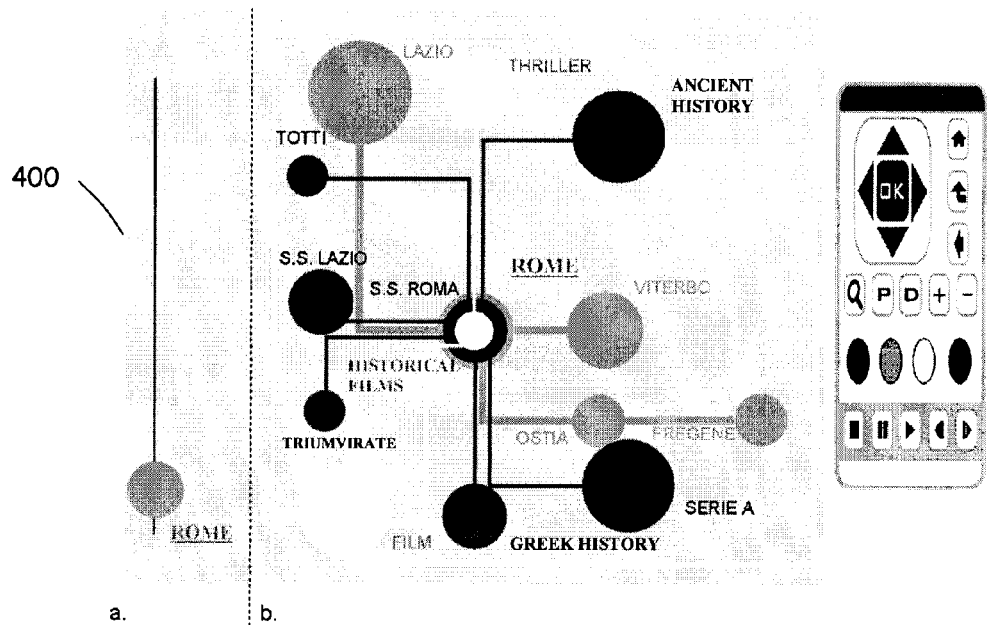
FIGS. 18-23 show a practical example of the method of exploration according to an embodiment of the present invention.

The starting situation is depicted in FIG. 18. All the four the taxonomies GEOGRAPHY, HISTORICAL EVENTS, SPORT, TYPOLOGY OF CONTENT are displayed on the screen 400 of the television of the user. It is assumed that the taxonomy currently selected is the taxonomy GEOGRAPHY, associated for instance with the green color and the actuator 1735 of the remote control 1700. The FOCUS category of the taxonomy currently selected is the one labeled "ROMA".

The other three taxonomies HISTORICAL EVENTS, SPORT, TYPOLOGY OF CONTENT are respectively associated with the colors red, blue and yellow and with the actuators 1730, 1740 and 1745 of the remote control 1700.

The displayable sub-hierarchy of the taxonomy GEOGRAPHY, generated starting from the FOCUS category "ROMA", is the following:
- at the higher level of the sub-hierarchy there is the category "LAZIO" (father category of the FOCUS category "ROME"). "LAZIO" is the general category of the sub-hierarchy closer to the category "ROMA", being Lazio the region where the city of Rome is located;
- at the same level of the category "ROMA" there is the category "VITERBO", because the city of Viterbo is also a province of the region Lazio corresponding to the father category "LAZIO";
- at the lower level, two of the more specific categories associated with the category "ROMA" are the categories "OSTIA" and "FREGENE", that correspond to two cities belonging to the territory of the province of Rome.

Each category is displayed on the screen 400 of the television through an icon shaped as a circle, and is associated with a label containing the name of the category. The icons associated with the categories preferably have a variable size that depends on the hierarchical level of affiliation: in the example the biggest icon corresponds to the more general category "LAZIO", the two intermediary icons to the brother categories "ROMA" and "VITERBO", and the smaller ones to the categories "OSTIA" and "FREGENE."

The FOCUS category and the corresponding explanation are recognizable by the underlining and the bold format of the font, that highlight the importance of the category role.

The category "ROME", FOCUS of the currently selected taxonomy, has a dynamic relationship with the categories "STORIA DI ROMA", "S.S. ROMA" (category corresponding to the soccer team of the city of Rome) and "FILM STORICI", belonging respectively to the taxonomies HISTORICAL EVENTS, SPORT, TYPOLOGY OF CONTENT.

Due to such dynamic relationships with the FOCUS category of the taxonomy currently selected, each of these categories is the FOCUS of the respective taxonomy. The selection of the displayed sub-hierarchies and the representation of the other taxonomies different from the taxonomy currently selected follow the rules described in the foregoing.

Thus, the category "STORIA DI ROMA", of the taxonomy HISTORICAL EVENTS, is connected to the father category "STORIA ANTICA", to the brother category "STORIA GRECA" and to the child category "TRIUMVIRATO"; the category "S.S. ROMA", of the taxonomy SPORT, is child of the category "SERIE A" (corresponding to the premier league—"Serie A"—of the Italian soccer championship) and brother of another soccer team belonging to the premier league, in the example the category "S.S. LAZIO" (corresponding to the other soccer square of the city of Rome), in addition to being father of the category "TOTTI", corresponding to one (the soccer player Totti) of the players of the soccer team corresponding to the category "S.S. ROMA"; the category "FILM STORICI" of the taxonomy "TYPOLOGY OF CONTENT" is connected to the more general category "FILMS" and to the brother category "THRILLER".

In the considered example, the unselected taxonomies are displayed on the screen 400 with a greater degree of transparency, to intuitively distinguish them from the currently selected taxonomy. The icons corresponding to the categories FOCUS of the different taxonomies, that are superimposed in the position of the screen 400 devoted to the FOCUS categories, are for instance displayed as nested (through concentric circles).

The visit path, visible on the left side of the screen 400 of the television, that contains the list of the FOCUS categories explored in the same exploration session of the catalog of information contents, in the initial condition only contains the starting FOCUS category ("ROMA").

Figure 19:
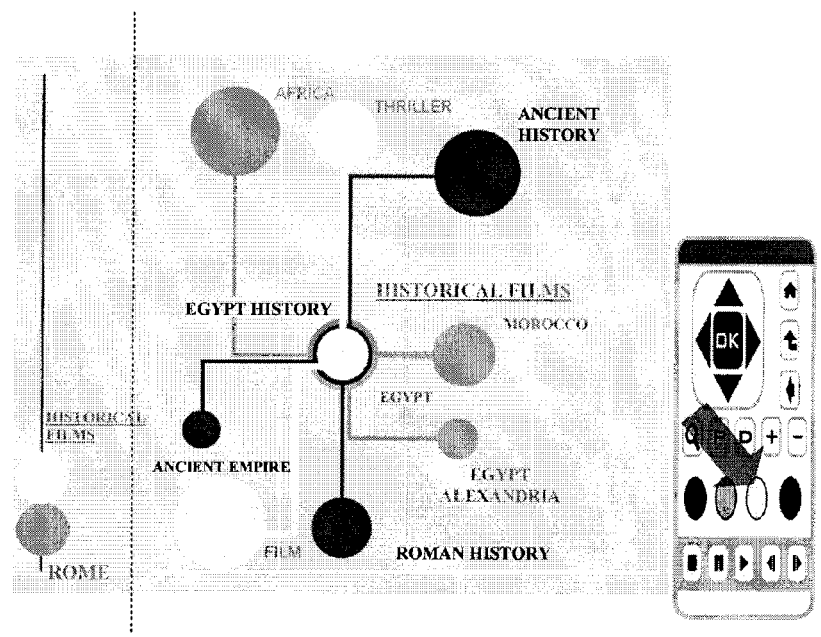

The example (FIG. 19) shows the access, beginning from the initial FOCUS category "ROMA" of the selected taxonomy "GEOGRAPHY", to the category "FILM STORICI" of the taxonomy "TYPOLOGY OF CONTENT" previously not selected. This corresponds to a change in the position of the planes (FIG. 9) hosting the taxonomies, i.e. the position a, previously occupied by the plane hosting the taxonomy "GEOGRAPHY", will subsequently be occupied by the plane hosting the taxonomy "TYPOLOGY OF CONTENT". This action is activated by the actuator 1740 of the remote control 1700. Once the change of position of the planes has taken place, the categories redistributes with respect to the new FOCUS category "FILM STORICI" of the taxonomy currently selected. In FIG. 19 there are shown the categories belonging to the other taxonomies that have a dynamic relationship with the new FOCUS category "FILM STORICI".

The FOCUS category of the taxonomy "GEOGRAPHY" no longer selected, to which the category "FILM STORICI" is superimposed, is no longer the category "ROMA", as it was before, but the category "EGITTO", in consequence of the asymmetry of the relationships between the categories. By selecting the taxonomy "GEOGRAPHY", as exemplified in FIG. 20, its FOCUS category is no longer the category "ROMA", rather it is the category "EGITTO", i.e. the category belonging to the taxonomy "GEOGRAPHY" with which the category "FILM STORICI", FOCUS category of the category "TYPOLOGY OF CONTENT", has a relationship. This again involves a change of position of the planes hosting the taxonomies, and it is achieved through the actuator 1735 of the remote control 1700.

Figure 20:
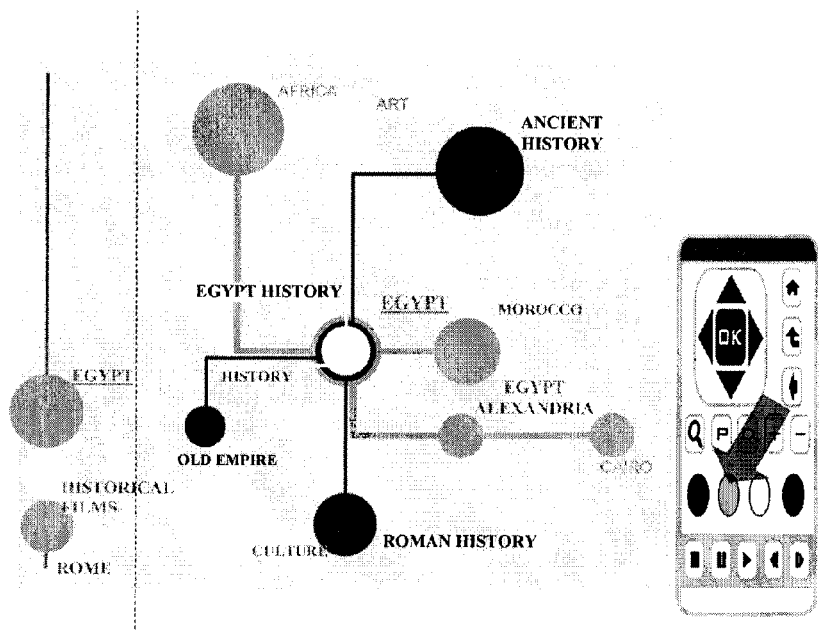
Figure 21:
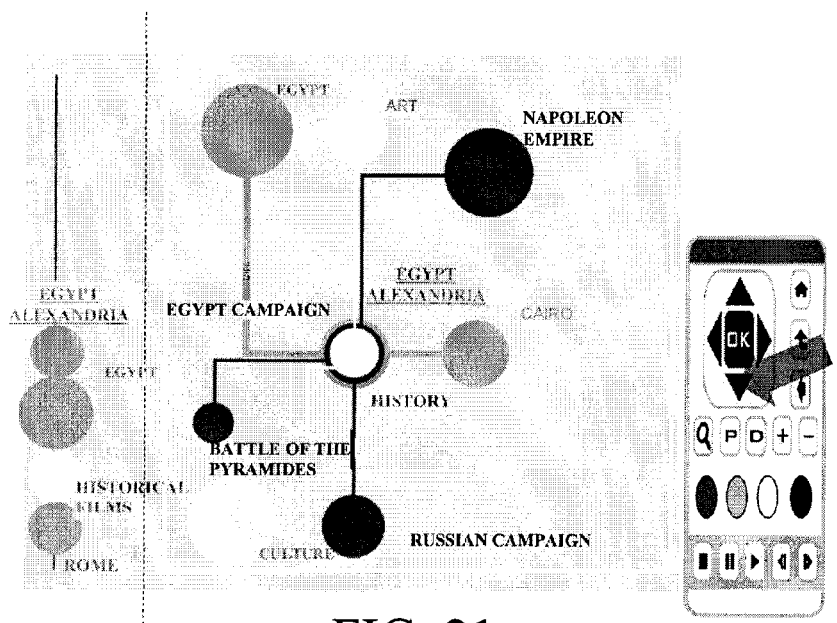

In FIG. 21 there is shown, starting from the condition shown in FIG. 20, the exploration of another category of the selected taxonomy, with consequent change of the FOCUS category from the category "EGITTO" to the category "ALESSANDRIA D'EGITTO". Among these two categories a father-child relationship exists. In this case, the shift to the lower level of the sub-hierarchy is activated by the actuator 1715 (downward arrow) of the remote control 1700. FIG. 21 also show how the whole display of the taxonomies reconfigures starting from the new FOCUS category "ALESSANDRIA D'EGITTO". The access to the list of the contents of one determined category is possible when it is FOCUS category of the selected taxonomy and to such end the selection key 1725 of the remote control is used.

Figure 22:
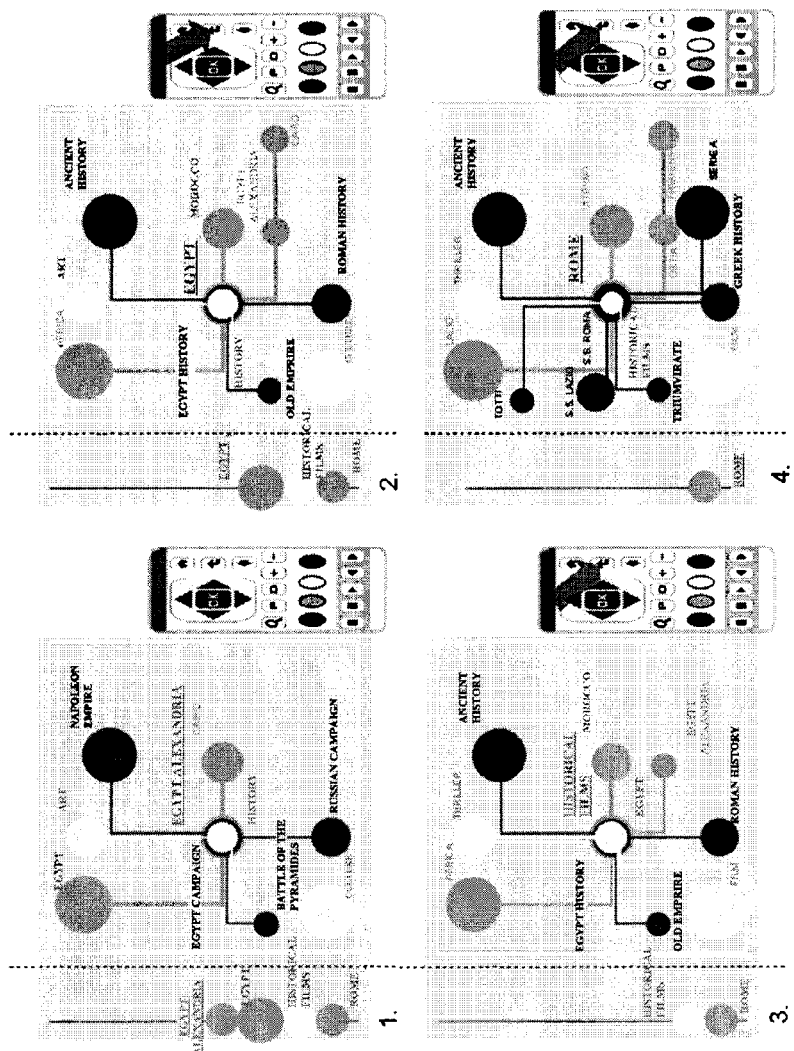

In FIG. 22 there is exemplified the exploration of the visit path; four consecutive conditions are shown; on the left part of the screen 400 the visit path is depicted as a list of categories, coincident with the FOCUS categories of the selected taxonomies previously explored during the same session of exploration of the contents. In the considered example, the visit path is accessed through the back key 1750 of the remote control, and the list is run through by repeatedly pressing it. By positioning on a category of the list and using the selection key 1725 of the remote control, the same category returns to be the selected FOCUS category and the taxonomy that contains it returns to be the selected taxonomy. Also the disposition of the categories of the other displayable taxonomies returns to be the same one found previously. The example shows the repositioning on the starting category "ROMA".

Figure 23:
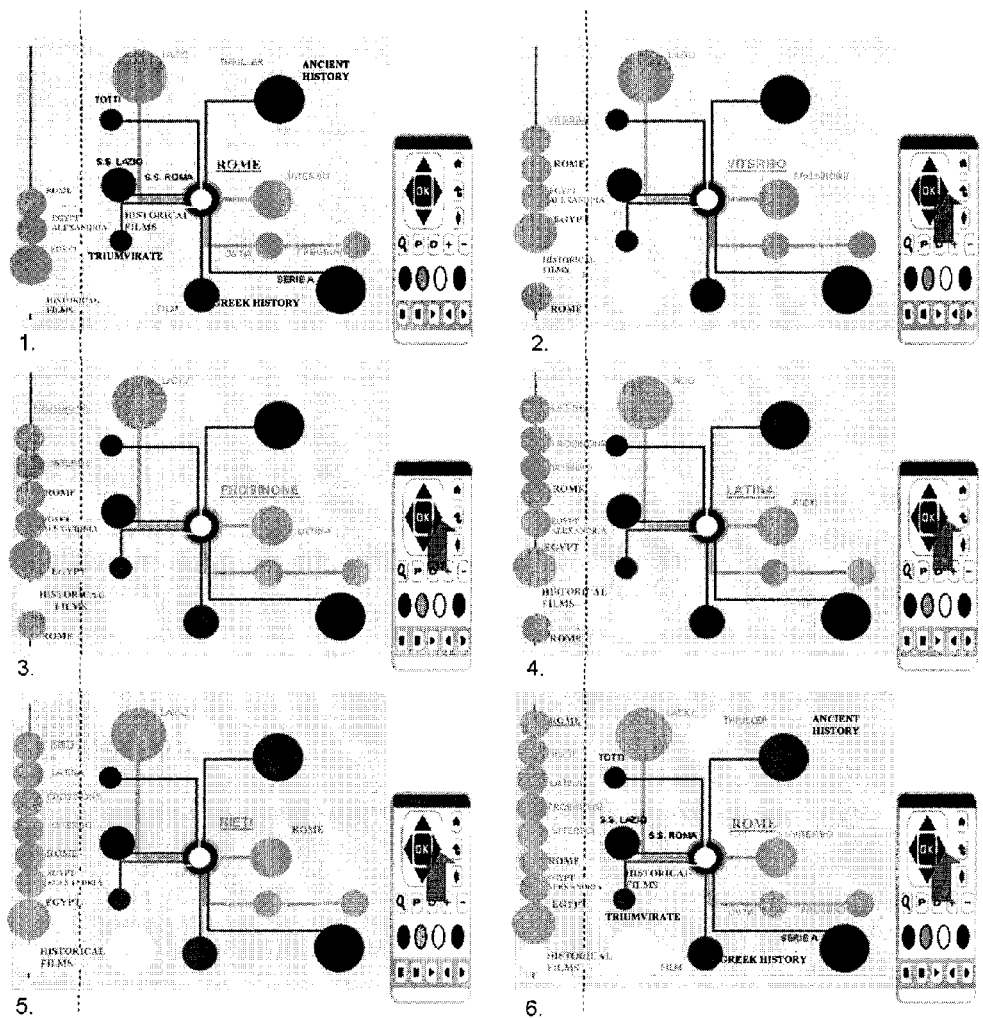

Finally, in FIG. 23 an example is shown of the "swap" mechanism of the categories in the exploration of the categories of the selected taxonomy belonging to the same level of the FOCUS category. The "swap" mechanism of the categories provides that, when a number of categories exists at the same hierarchical level of the FOCUS category and belonging to the same taxonomy higher than the number of available hosting sectors of the screen for that hierarchical level, such categories occupies in cyclical way the available sectors, becoming by rotation FOCUS category. The shown sequence describes how, starting from the FOCUS category "ROMA", it is possible to pass through, in cyclical way, the brother categories (at the same hierarchical level), i.e. the other provinces of the region Lazio, using the key 1720 (right arrow) of the remote control. Once all the categories belonging to the same hierarchical level have been passed through, the FOCUS category will return to be the category "ROMA", i.e. the starting category. It is pointed out that, in the figure, and in order not to complicate the drawing, the reconfiguration of the categories of the other taxonomies for every change of FOCUS category is not shown.

The present invention can for example find application within the offer of IPTV (Internet Protocol TeleVision) services, in the navigation of the World Wide Web, in the field of mobile communication terminals like smart-phones, in the field of the user interfaces for the navigation in the field of Digital Home and for devices developed ad hoc for specific applications (for instance, in the field of restaurants, clothing, food industry etc.), and in general in all the cases in which it is necessary to offer forms of organization and exploration of semantic type of large amounts of information contents.

The invention claimed is:

1. A method for exploring a catalog of digital information contents through a user apparatus comprising a display screen, in which said catalog of digital information contents is structured according to at least two hierarchical tree structures each comprising a respective hierarchy of nodes, each node corresponding to a respective category of digital information contents, comprising:

selecting a first sub-hierarchy of nodes of a first one of said at least two hierarchical tree structures, said first sub-hierarchy of nodes being built beginning from a selected category of said first hierarchical structure by selecting at least one among a first number of categories at immediately higher hierarchical levels with respect to the selected category and a second number of categories at immediately lower hierarchical levels with respect to the selected category;

selecting a second sub-hierarchy of nodes of a second one of said at least two hierarchical tree structures, said second sub-hierarchy of nodes being built beginning from a destination category of said second hierarchical structure, said destination category being in relationship with said selected category, by selecting at least one among a first number of categories at immediately higher hierarchical levels with respect to the destination category and a second number of categories at immediately lower hierarchical levels with respect to the destination category;

simultaneously displaying on the screen, icons representative of all of the categories of the selected first and the selected second sub-hierarchy and respective relationships between the categories, wherein each of the icons represents only one category, and an icon of the icons representing the selected category at least partially overlaps an icon of the icons representing the destination category; and exploring the categories of the first and of the second sub-hierarchy by reacting to commands imparted by a user through said user apparatus.

2. The method of claim 1, wherein displaying the categories on the screen comprises:

dividing an area of the screen in a number of zones corresponding to a number of hierarchical levels of the first and of the second sub-hierarchies;

dividing each of said zones into a plurality of sectors;

selecting, for each of said zones, respective sectors; and displaying said icons in the selected sectors.

3. The method of claim 2, wherein said second sub-hierarchy is displayed on the screen rotated at a respective prescribed angle in comparison to said first sub-hierarchy.

4. The method of claim 3, wherein the position of the screen in which the icons of the selected category of the first sub-hierarchy and the destination category of the second sub-hierarchy are displayed is substantially at the same position.

5. The method of claim 4, wherein the icons of the selected category of the first sub-hierarchy and the destination category of the second sub-hierarchy are shown on the screen with different levels of transparency.

6. The method of claim 4, wherein the icons of the selected category of the first sub-hierarchy and the destination category of the second sub-hierarchy are shown on the screen nested one to the other.

7. The method of claim 1, wherein said commands are imparted by the user through keys of a keyboard interface of the user apparatus, or, in case said screen is a touch screen, touching the screen in regions in which the categories are displayed.

8. The method of claim 1, comprising:

following the selection, upon command of the user, of a category different from said selected category, redetermining said first and said second sub-hierarchies and displaying the sub-hierarchies thus redetermined on the screen.

9. The method of claim 1, comprising:
displaying in a predetermined area of the screen, a list of categories explored by the user and enabling a selection of any of the categories explored previously.

10. A user apparatus comprising a display device and capable of being connected through a data network to a remote server system capable of being adapted to make available for consultation a catalog of digital information contents structured according to at least two hierarchical tree structures, each comprising a respective hierarchy of nodes, each node corresponding to a respective category of digital information contents, in which the user apparatus is configured so as to perform the method of claim 1.

11. A system comprising:
at least one remote server system capable of being adapted to make available to users a catalog of digital information contents structured according to at least two hierarchical tree structures, each comprising a respective hierarchy of nodes, each node corresponding to a respective category of digital information contents; and
a user apparatus of claim 10.

12. The method of claim 1, wherein all of the categories of the first sub-hierarchy are different from each other and are different from all of the categories of the second sub-hierarchy.

13. The method of claim 1, wherein the first sub-hierarchy and the second sub-hierarchy are disposed on different planes from one another.

* * * * *